US011380070B2

(12) United States Patent
Koidahl

(10) Patent No.: US 11,380,070 B2
(45) Date of Patent: Jul. 5, 2022

(54) REAL-TIME AUGMENTATION OF A VIRTUAL OBJECT ONTO A REAL-WORLD OBJECT

(71) Applicant: The Paddock LLC, Shoreline, WA (US)

(72) Inventor: Riley Koidahl, Shoreline, WA (US)

(73) Assignee: The Paddock LLC, Shoreline, WA (US)

( * ) Notice: Subject to any disclaimer, the term of this patent is extended or adjusted under 35 U.S.C. 154(b) by 0 days.

(21) Appl. No.: 17/085,996

(22) Filed: Oct. 30, 2020

(65) Prior Publication Data

US 2021/0134066 A1    May 6, 2021

Related U.S. Application Data

(60) Provisional application No. 62/928,332, filed on Oct. 30, 2019.

(51) Int. Cl.

| *G06T 7/73* | (2017.01) |
| *G06T 7/20* | (2017.01) |
| *G06T 7/62* | (2017.01) |
| *G06V 10/40* | (2022.01) |
| *G06V 20/10* | (2022.01) |
| *G06T 19/00* | (2011.01) |

(52) U.S. Cl.
CPC .............. *G06T 19/006* (2013.01); *G06T 7/20* (2013.01); *G06T 7/62* (2017.01); *G06T 7/73* (2017.01); *G06V 10/40* (2022.01); *G06V 20/10* (2022.01)

(58) Field of Classification Search
CPC .......... G06T 19/006; G06T 7/62; G06T 7/73; G06T 7/20; G06K 9/00664; G06K 9/46
See application file for complete search history.

(56) References Cited

U.S. PATENT DOCUMENTS

| 8,803,916 | B1* | 8/2014 | Paczkowski | ............ G06T 11/60 |
| | | | | 345/633 |
| 9,129,644 | B2 | 9/2015 | Gay et al. | |
| 9,384,594 | B2 | 7/2016 | Maciocci et al. | |
| 9,586,141 | B2 | 3/2017 | Hardy et al. | |
| 2009/0113349 | A1* | 4/2009 | Zohar | .................... G06Q 30/00 |
| | | | | 715/852 |
| 2012/0229508 | A1* | 9/2012 | Wigdor | .................. G06F 3/147 |
| | | | | 345/633 |

(Continued)

*Primary Examiner* — Jitesh Patel
(74) *Attorney, Agent, or Firm* — Han Santos, PLLC

(57) ABSTRACT

This disclosure describes techniques that enable an augmentation controller to generate a real-time augmented multimedia stream. More specifically, the augmentation controller may receive a real-time multimedia stream from a client device, along with a representation of a related, virtual object. The real-time multimedia stream may be analyzed to identify a real-world object (i.e. a vehicle) along with a set of associated feature descriptors (i.e. vehicle wheels). Similarly, the augmentation controller may identify feature descriptors of the virtual object (i.e. wheelrim) and in doing so, overlay a representation of the virtual object on the real-world object based on an alignment of their respective feature descriptors. In this way, the augmentation controller may transmit to the client device, an augmented multimedia stream of the real-time multimedia stream with the virtual object overlaid onto the real-world object.

20 Claims, 8 Drawing Sheets

(56) References Cited

U.S. PATENT DOCUMENTS

| | | | |
|---|---|---|---|
| 2013/0215230 A1 | 8/2013 | Miesnieks et al. | |
| 2013/0326018 A1* | 12/2013 | Ryu | G06K 9/00979 |
| | | | 709/217 |
| 2015/0202962 A1* | 7/2015 | Habashima | B60K 35/00 |
| | | | 345/633 |
| 2016/0163113 A1* | 6/2016 | Lyons | A63F 13/213 |
| | | | 463/29 |
| 2016/0188616 A1* | 6/2016 | Nivala | G06F 16/13 |
| | | | 707/825 |
| 2017/0076499 A1 | 3/2017 | Jiang et al. | |
| 2017/0323374 A1* | 11/2017 | Park | G06F 3/147 |
| 2017/0372526 A1* | 12/2017 | Groten | G06F 3/0346 |
| 2018/0005450 A1* | 1/2018 | Daniels | G06T 19/006 |
| 2019/0318404 A1* | 10/2019 | LaMontagne | G06Q 30/0643 |

\* cited by examiner

REAL-TIME AUGMENTATION OF A VIRTUAL OBJECT ONTO A REAL-WORLD OBJECT

RELATED APPLICATION

This application claims priority to a commonly owned U.S. Provisional Patent Application 62/928,332 filed on Oct. 30, 2019, and titled "Software and method for superimposing vehicle parts," which is herein incorporated by reference in its entirety.

BACKGROUND

Present-day, augmented reality technology provides several solutions for augmenting a representation of an object onto real-world objects. For example, a virtual representation of vehicle parts, such as wheelrims, may be augmented onto a real-world representation of a vehicle. While current technology allows for virtual objects to be augmented onto real-world objects, the overlay may be limited by the viewing scale, viewing perspective, or shape of the real-world objects.

More specifically, current technology allows for a two-dimensional static overlay of virtual to real-world objects, but is unable to accommodate, in real-time, changes in viewing perspective that introduce a third dimension, especially, when changes in the viewing perspective involve motion of the real-world object.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
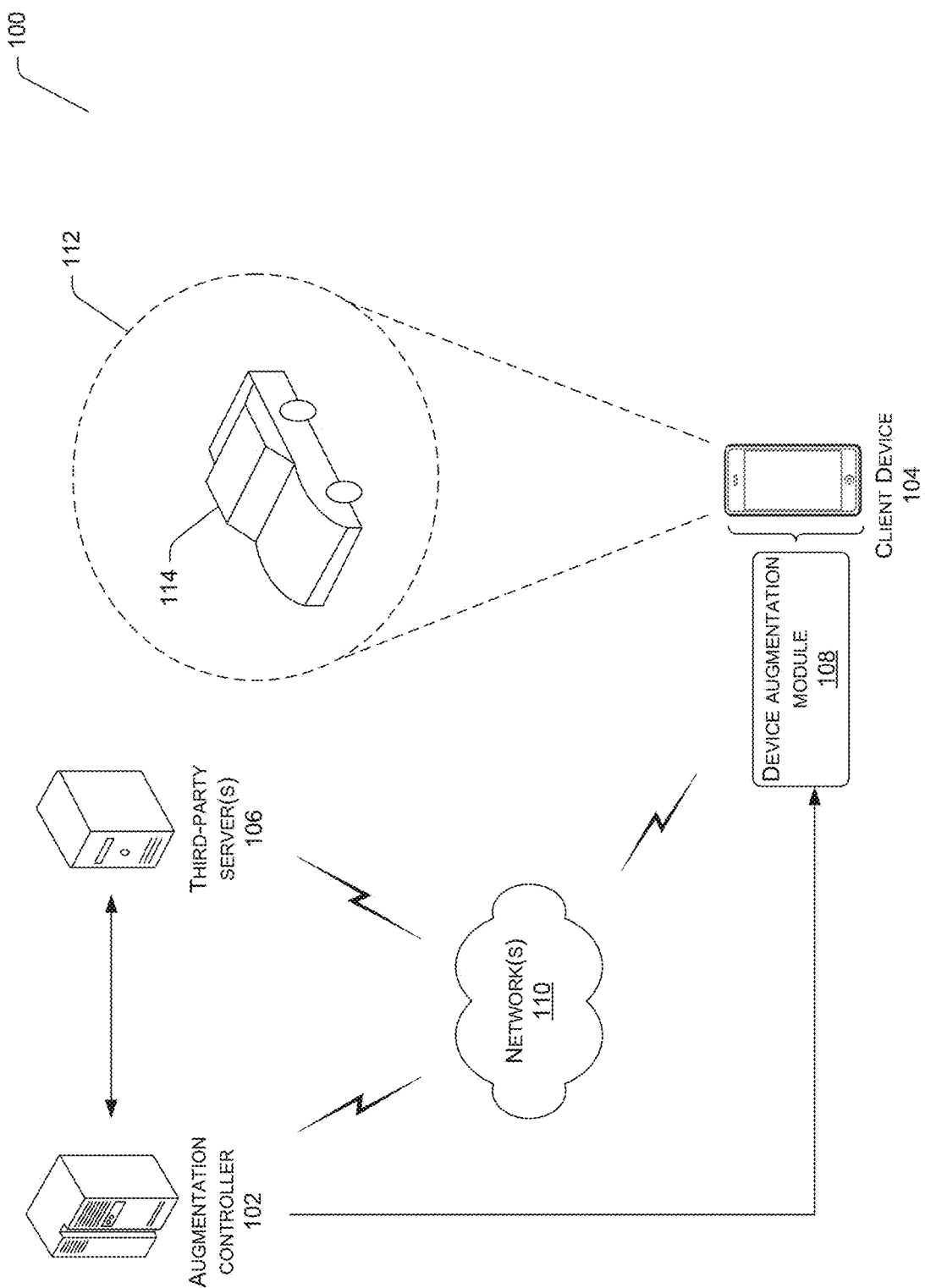
FIG. 1 illustrates a computing environment that facilitates an operation of an augmentation controller.

This disclosure describes techniques that enable an augmentation controller to generate an augmented multimedia stream, in real-time, that overlays a virtual object onto a real-world object. More specifically, the augmentation controller is configured to generate an augmented multimedia stream while accommodating for real-time changes in viewing perspective, viewing scale, and motion of the real-world object relative to its real-world environment.

More specifically, the augmentation controller may receive, from a client device, a real-time multimedia stream of a real-world environment. Upon receipt, the augmentation controller may employ one or more machine-learning algorithms to analyze real-time multimedia to identify the real-world object. The real-world object may correspond to any tangible product, such as a building, a vehicle, a table, a chair, a bridge, or a naturally occurring formation, such as a river, mountain-face, and/or so forth.

An analysis of the real-world object may involve defining a set of feature descriptors to associate with portions of the real-world object. The set of feature descriptors are intended to act as anchor points for the overlay of virtual objects. For example, consider a vehicle as the real-world object. Here, the augmentation controller may define a set of feature descriptors as the vehicle wheels, the side undercarriage edge of the vehicle, the rear edge of the vehicle wheel wells, the rear edge of a trunk, and so forth. The set of feature descriptors in this example are set to interface with virtual objects that correspond to automotive accessories. For example, the feature descriptor associated with the vehicle wheel may be configured to anchor virtual wheelrims; the feature descriptor associated with the side undercarriage edge of a vehicle may be configured to anchor virtual side skirts; the feature descriptor associated with the rear edge of the vehicle wheel wells may be configured to anchor mud-guards; the feature descriptor associated with the rear-edge of a trunk may be configured to anchor a virtual spoiler, and so forth.

In response to defining a set of feature descriptors for the real-world object, the augmentation controller may identify virtual objects to overlay onto the real-world object. In one example, the augmentation controller may infer the types of virtual objects based on the set of feature descriptors associated with the real-world object. For example, the types of virtual objects for a vehicle (i.e. real-world object) may include wheelrims, side skirts, spoilers, or any combination thereof.

Further, the augmentation controller may transmit a message to the client device requesting a selection of a type of virtual object to overlay onto the real-world object, based at least in part on the set of feature descriptors. Upon receipt of a user selection, the augmentation controller may present the client device with one or more options relating to the selection. For example, the augmentation controller may present one or more wheelrims to overlay onto vehicle wheels, based at least in part on a user selection of wheelrims.

Rather than receiving a user selection of a virtual object type (i.e. wheelrim) to overlay onto a real-world object, the augmentation controller may prompt and receive an image of a virtual object that a consumer would like to overlay onto a real-world object. Here, the augmentation controller may analyze an image of a virtual object, infer the virtual object type, and further present one or more virtual objects to overlay onto the real-world object, based at least in part on the inferred virtual object type.

In various examples, the augmentation controller can be configured to maintain an overlay of the virtual object on the real-world object despite the dynamic movement of the real-world object relative to its environment. Dynamic movement may include a change in orientation, viewing scale, or a detected motion of the real-world object relative to its environment. In each of these instances, the augmentation controller is configured to synchronize a change in orientation, viewing scale, or motion of the virtual object relative to the real-world object. In order to synchronize a virtual object with a dynamic movement of a real-world object, the augmentation controller may generate a virtual object profile that parameterizes at least one of a viewing scale or a viewing perspective of a virtual object. In this way, following an analysis of a real-time multimedia stream to determine an orientation and viewing scale of a real-world object, the augmentation controller may use the virtual object profile to create a representation of the virtual object that aligns with the orientation and size of the real-world object. The virtual object profile may be used to modify a representation of the virtual object in real-time. In other words, if a stationary real-world object begins to move, the representation of the virtual object may change, accordingly.

In order to facilitate a change in orientation and viewing scale of a virtual object relative to a real-world object, the augmentation controller may generate a second set of feature descriptors for the virtual object. Each set of feature descriptors may include feature descriptors positioned on one of the three cardinal axes (i.e. x, y, and z) of the virtual object and the real-world object. The purpose of doing so is to ensure that the interface of a real-world object and a virtual object can be augmented to cater to three-dimensional movement, changes in viewing scale, or changes in viewing perspective.

Therefore, the overlay of a virtual object to a real-world object may involve anchoring a first set of feature descriptors (i.e. real-world object) to a second set of feature descriptors (i.e. virtual world object). In the event that the real-world object moves, or its viewing perspective changes—as viewed from the client device—the position of the virtual object relative to the real-world object may remain unchanged.

In one example, a movement of a real-world object may trigger a synchronous movement of an interfacing virtual object, without causing a change in the profile of the virtual object. In this example, consider a vehicle (i.e. real-world object) in a straight-line motion. Further, consider a set of feature descriptors associated with a vehicle wheel for the purpose of anchoring a virtual representation of a wheelrim (i.e. virtual object). The vehicle may be viewed from a client device as moving in a straight line from the left of the client device screen towards the right. Here, even though the vehicle is moving, the viewing perspective of the vehicle is substantially unchanged. Therefore, the set of feature descriptors on the vehicle wheel may move relative to the client device, based on the vehicle movement; however, due to the substantially unchanged viewing perspective, the displacement of each feature descriptor relative to the other feature descriptors within the set, remains unchanged. In other words, since there is no change in viewing angle, the displacement of feature descriptors relative to one another is unchanged. Therefore, while the virtual object (i.e. wheelrim) remains anchored to the real-world object (i.e. vehicle) based on the sets of interfacing feature descriptors, the profile of the virtual object (i.e. wheelrim) remains unchanged.

In another example, a change in viewing perspective of a real-world object—as viewed from a client device—may cause a change in the profile of the virtual object. Here, the viewing perspective may change by moving the client device around the vehicle, or in response to a turning motion of the vehicle as viewed from the client device. In this example, the change in viewing perspective may cause the displacement of feature descriptors within a set of feature descriptors to change relative to one another. Therefore, while the virtual object (i.e. wheelrim) remains anchored to the real-world object (i.e. vehicle) based on the sets of interfacing feature descriptors, the change in viewing perspective triggers a change in the profile of the virtual object.

It is noteworthy that a change in viewing perspective may also occur through movements of the client device towards or away from the real-world object, which effectively changes the size of the real-world object as viewed by the client device. While the proportional displacement of feature descriptors relative to one another may be unchanged, the magnitude of the displacement may change, which in turn may trigger a corresponding change in the profile of an interfacing virtual object. In either case, the augmentation controller may use a virtual object profile associated with the virtual object to generate a representation of the virtual object, based on changes to a viewing perspective.

In various examples, the augmentation controller may reside on the client device and may be communicatively coupled to a camera of the client device. In another example, the augmentation controller may reside on a remote server that is accessible via an augmentation application that resides on the client device. In each embodiment, the augmentation application is configured to receive, from the client device, a real-time multimedia stream and transmit, to the client device, a real-time augmented multimedia stream.

While the techniques described within this disclosure focus on use-cases relating a vehicle (i.e. real-world object) and automotive accessories (i.e. virtual object), one of ordinary skill in the art may appreciate that variations and modification can be made such that the augmentation controller may generate an augmented multimedia stream for any related combination of a real-world object and virtual object. For example, and without limitation, the real-world object may correspond to a moving aircraft and the virtual object may correspond to a color scheme of the aircraft. Alternatively, or additionally, the real-world object may correspond to a sailboat, and the virtual object may correspond to a color/advertising schema on a sail of the sailboat.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a computing environment that facilitates an operation of an augmentation controller. The computing environment 100 may include an augmentation controller 102, a client device 104, and one or more third-party server(s) 106. The augmentation controller 102 may be configured to generate a real-time augmented multimedia stream that overlays a virtual object onto a real-world object. In an alternative embodiment, the functionality performed by the augmentation controller 102 may be performed by a device augmentation module 108 that resides on the client device 104.

In the illustrated example, the augmentation controller 102 may be communicatively coupled to the client device 104 via one or more network(s) 110. The augmentation controller 102 may receive a real-time multimedia stream 112 from the client device 104 to generate an augmented multimedia stream that overlays a virtual object onto a real-world object 114. In some examples, the augmentation controller 102 may analyze the real-time multimedia stream received from the client device 104 to identify a prominent real-world object 114. In doing so, the augmentation controller 102 may prompt the client device 104 for a selection of virtual objects or virtual object types that may be overlaid onto the real-world object 114. By way of example, a real-world object 114 may correspond to an automotive vehicle, and virtual objects/virtual object types may correspond to externally mounting automotive accessories.

In response to identifying a virtual object to overlay onto a real-world object 114, the augmentation controller 102 may generate the virtual object to overlay onto the real-world object 114. In some examples, the augmentation controller 102 may interact with the third-party server(s) 106 via one or more network(s) 110. The third-party server(s) 106 may comprise repositories of virtual objects and/or related metadata that can be used to generate virtual objects on a client device. The third-party server(s) 106 may include commercial vendors that are incentivized to overlay their products as virtual objects onto real-world objects. Metadata may include part specifications, along with aesthetic variations, such as color, design-pattern, size, and/or so forth.

Further, the augmentation controller 102 may capture the real-time multimedia stream from the client device 104 and transmit an augmented multimedia stream continuously, per a predetermined schedule, or in response to a triggering event. The predetermined schedule may be set by an operator of the augmentation controller 102 and may correspond to any time interval, such as one second, five seconds, or ten seconds. Further, the triggering event may correspond to a motion detected by the client device 104. The motion may be attributed to the movement of the client device 104 relative to the real-world object 114, the real-world object 114 relative to the client device 104, or a combination of both.

In the illustrated example, the client device 104 may include the device augmentation module 108 that is communicatively coupled to the augmentation controller 102 via one or more network(s) 110. The device augmentation module 108 may be configured to transmit a real-time multimedia stream to the augmentation controller 102 and receive an augmented multimedia stream from the augmentation controller 102. In an alternate embodiment, the device augmentation module 108 may perform the functionality of the augmentation controller 102, thereby negating the demand for transmitting a real-time multimedia stream to the augmentation controller 102 and in response, receiving an augmented multimedia stream.

The augmentation controller 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the client device 104 via one or more network(s) 110.

The one or more network(s) 110 may include public networks such as the Internet, private networks such as an institutional and/or personal intranet, or some combination of private and public network(s). The one or more network(s) can also include any type of wired and/or wireless network, including, but not limited to, local area network (LANs), wide area network(s) (WANs), satellite networks, cable networks, Wi-Fi networks, Wi-Max networks, mobile communications networks (i.e. 5G-NR, LTE, 3G, 2G), or any combination thereof.

Moreover, the client device 104 may include any sort of electronic device, such as a television unit, a multimedia streaming device, a cellular phone, a smartphone, a tablet computer, an electronic reader, a media player, a gaming device, a personal computer (PC), a laptop computer, etc. The client device 104 may also include network devices that act as intermediaries between the client device 104 that execute user applications and the Internet. It is noteworthy that the Internet is accessible via one or more network(s). In some examples, the client device 104 may include a subscriber identity module (SIM), such as an eSIM, to identify the client device 104 to a telecommunication service provider (also referred to herein, as "telecommunications network").

Figure 2:
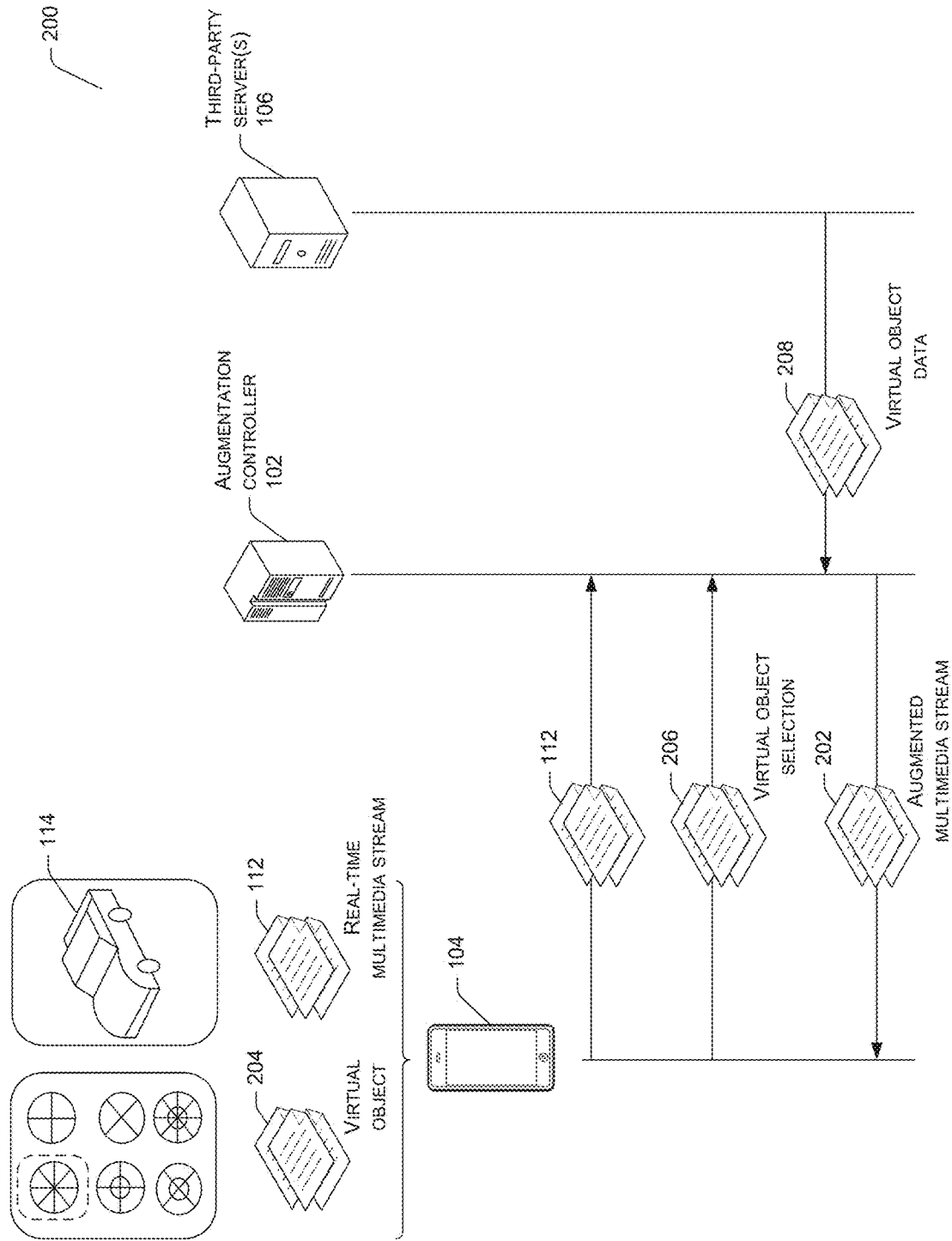
FIG. 2 illustrates a block diagram of an aggregation controller capturing a real-time multimedia stream from a client device and generating an augmented multimedia stream.

FIG. 2 illustrates a block diagram of an aggregation controller capturing a real-time multimedia stream from a client device and generating an augmented multimedia stream. The augmentation controller 102 may generate and transmit the augmented multimedia stream 202 to the client device 104 in real-time. The augmented multimedia stream 202 may comprise of a real-time multimedia stream shared by the client device 104 that includes images of a real-world object 114, and a virtual object 204 overlaid onto the images of the real-world object 114. In some examples, the augmentation controller 102 may continuously update the augmented multimedia stream 202 based on the movement of the real-world object 114 or changes in its viewing posture. Viewing posture equates to the orientation, viewing scale, or viewing perspective of the real-world object 114.

In the illustrated example, the client device 104 may transmit a real-time multimedia stream 112 to the augmentation controller 102. The real-time multimedia stream 112 may comprise an audio and visual stream of a real-world environment captured by the client device 104. The client device 104 may capture the real-time multimedia stream 112 via camera and microphone sensors.

In response to receiving the real-time multimedia stream 112, the augmentation controller 102 may analyze the real-time multimedia stream to identify a real-world object 114 that is visually captured in the stream. The real-world object 114 may correspond to any tangible product, such as a building, a vehicle, a table, chair, a bridge, or a naturally occurring formation, such as a river, mountain-face, and/or so forth.

In doing so, the augmentation controller 102 may further prompt and receive, from the client device 104, a virtual object selection 206 to overlay onto the real-world object 114. In one example, the real-world object 114 may be configured to receive multiple types of virtual objects. For example, an automotive vehicle (i.e. real-world object) may be configured to receive multiple types of automotive accessories (i.e. virtual objects), such as wheelrims, mudguards, spoiler assemblies, roof racks, or any other accessory type with at least one mounting point to an external feature of the vehicle. In this instance, the augmentation controller 102 may prompt and receive, from the client device 104, a selection of a virtual object type. In doing so, the augmentation controller 102 may transmit, to the client device 104, a selection of virtual objects based on the selected virtual object type. Alternatively, if the real-world object 114 is configured to receive one type of virtual object 204, the augmentation controller 102 may transmit, to the client device 104, a selection of virtual objects without prompting the client device 104 for a selection of a virtual object type.

In some examples, the augmentation controller 102 may interact with a third-party server(s) 106 to access repositories of virtual object data 208, such as a virtual object 204 and/or related metadata for display on a client device 104.

Moreover, the augmentation controller 102 may be configured to generate an augmented multimedia stream 202 for delivery to the client device 104. The augmented multimedia stream 202 may be generated by overlaying the virtual object 204 onto the real-world object 114 within the real-time multimedia stream 112. The overlay may occur by anchoring a set of feature descriptors associated with the virtual object 204 to another set of feature descriptors associated with the real-world object 114. Feature descriptors are portions, or reference points, associated with the virtual object 204 and real-world object 114, that act as interfacing anchor points. In the event that the real-world object moves, or its viewing perspective changes—as viewed from a client device 104—the relative position of the virtual object 204 to the real-world object 114 may remain unchanged based on the interfacing sets of feature descriptors.

Figure 3:
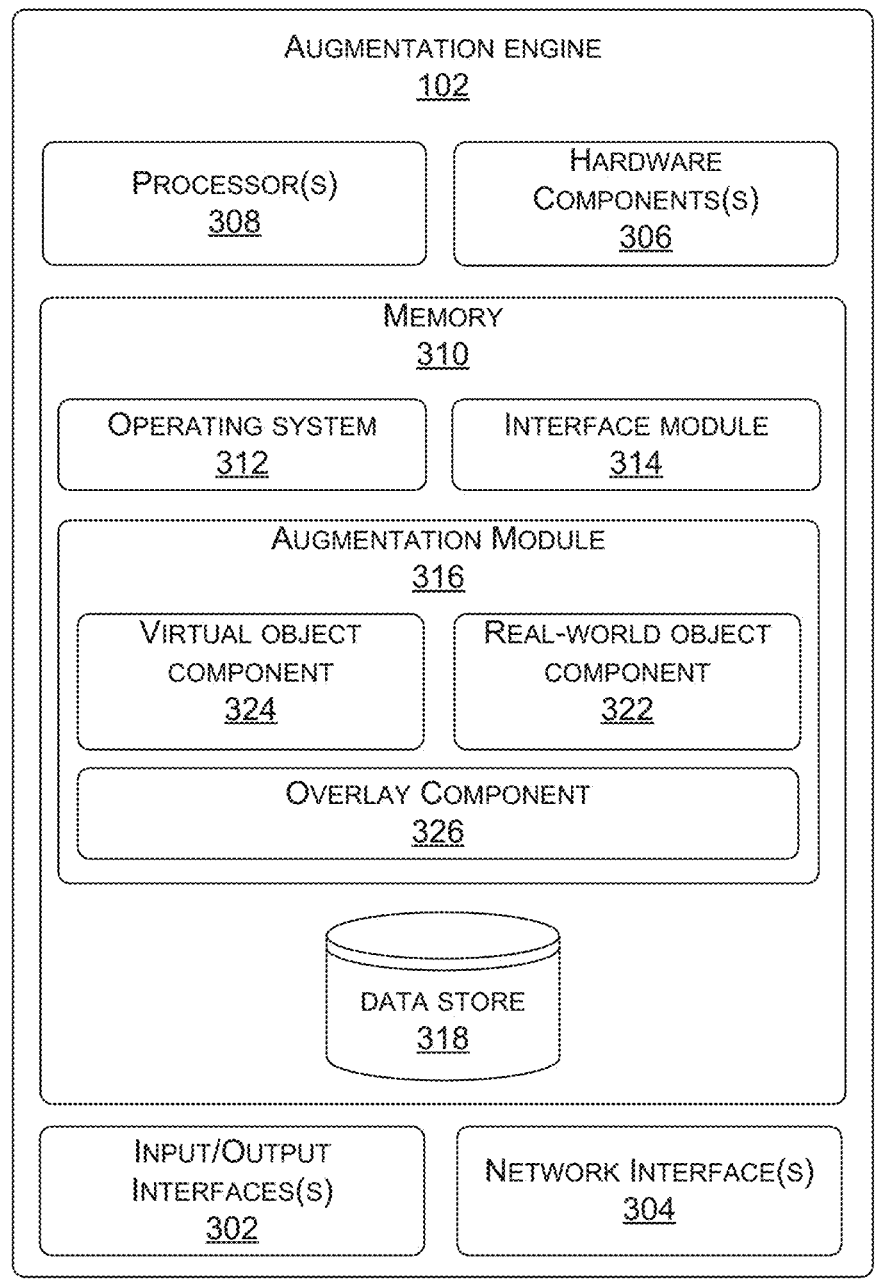
FIG. 3 illustrates various components of the augmentation controller.

FIG. 3 illustrates various components of the augmentation controller. The augmentation controller may be configured to generate an augmented multimedia stream, in real-time, that overlays a virtual object onto a real-world object.

The augmentation controller 102 may include input/output interface(s) 302. The input/output interface(s) 302 may include any type of output interface known in the art, such as a display (e.g. a liquid crystal display), speakers, a vibrating mechanism, or a tactile feedback mechanism. Input/output interface(s) 302 also include ports for one or more peripheral devices, such as headphones, peripheral speakers, or a peripheral display. Further, the input/output interface(s) 302 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the augmentation controller 102 may include network interface(s) 304. The network interface(s) 304 may include any sort of transceiver known in the art. For example, the network interface(s) 304 may include a radio transceiver that performs the function of transmitting and receiving radio frequency communications via an antenna. Also, the network interface(s) 304 may include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 304 may include wired communication components, such as an Ethernet port or a Universal Serial Bus (USB). Hardware component(s) 306 may include additional hardware interface, data communication hardware, and data storage hardware.

Further, the augmentation controller 102 may include one or more processor(s) 308 that are operably connected to memory 310. In at least one example, the one or more processor(s) 308 may be a central processing unit(s) (CPU), graphics processing unit(s) (GPU), or both a CPU and GPU or any other sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 308 may also be responsible for executing all computer applications stored in the memory, which can be associated with common types of volatile (RAM) and/or non-volatile (ROM) memory.

In some examples, memory 310 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 310 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 310 may include an operating system 312, an interface module 314, an augmentation module 316, and a data store 318. The operating system 312 may be any operating system capable of managing computer hardware and software resources. The operating system 312 may include an interface layer that enables applications to interface with the input/output interface(s) 302 and the network interface(s) 304.

The interface module 314 may be configured to interface with a device augmentation module 108 of a client device 104. The client device may be configured to communicate a real-time multimedia stream to the interface module 314, and further receive an augmented multimedia stream in response to the overlay of a virtual object onto a real-world object.

Further, the interface module 314 may be configured to interface with third-party server(s) to access repositories of virtual objects and/or related metadata for display on a client device. The third-party server(s) may include commercial vendors that are incentivized to overlay their products as virtual objects onto the real-world object.

The augmentation module 316 further includes a real-world object component 320, a virtual object component 322, and an overlay component 326. The real-world object component 320 may be configured to analyze a real-time multimedia stream to identify a real-world object that is visually captured by the stream. The real-world object may correspond to any tangible product or formation, such as a building, a vehicle, a table, a chair, a bridge, or a naturally occurring formation, such as a river, mountain-face, and/or so forth.

In some examples, the real-world object component 320 may employ one or more machine learning algorithms to analyze the real-time multimedia data. The one or more trained machine-learning algorithms may make use of techniques such as supervised learning, unsupervised learning, semi-supervised learning, naive Bayes, Bayesian network, decision trees, neural networks, fuzzy logic models, and/or probabilistic classification models.

Further, the real-world object component 320 may be configured to identify portions of the real-world object to which a virtual object may be overlaid. In this example, the real-world object component 320 may identify the real-world object, and in doing so, interact with the data store 318 or third-party resources to determining the availability of virtual objects to overlay. Third-party resources may include commercial vendors that are incentivized to overlay their products onto a real-world object. By way of example, the real-world object component 320 may identify a real-world object as an automotive vehicle, and in doing so, interact with automotive accessory vendors to identify automotive accessories that may be overlaid as virtual objects. Automotive accessories may include, without limitation, wheel-rims, mudguards, spoiler assemblies, roof racks, or any other accessory type with at least one mounting point to an external feature of the vehicle.

Moreover, the real-world object component 320 may generate and associate a first set of feature descriptors with portions of the real-world object to which a virtual object may be overlaid. The first set of feature descriptors are intended to act as anchor points for the overlay of the virtual object. In some examples, the first set of feature descriptors may include feature descriptors in each of the three cardinal axes (i.e. x, y, and z) to ensure that any three-dimensional movement, change in viewing scale, or change in viewing perspective, can be captured.

The virtual object component 322 may be configured to generate a virtual object to overlay onto a real-world object within a real-time multimedia stream. Each virtual object may be a two-dimensional object, a three-dimensional object, or both. In some examples, the virtual object component 322 may access the data store 318 or a third-party repository to identify virtual objects that can be overlaid onto a real-world object. By way of example, virtual objects may correspond to externally mounted automotive accessories that can be overlaid onto an automotive vehicle. In this example, each virtual object may metadata, such as part specifications, along with aesthetic variations, such as color, design-pattern, size, and/or so forth. The metadata may be presented on a screen of a client device while the augmented multimedia stream is being viewed.

Further, the virtual object component 322 may generate and associate a second set of feature descriptors with the virtual object. The second set of feature descriptors are intended to interface with the first set of feature descriptors on the real-world object. For example, a wheelrim (i.e. virtual object) may be configured to interface with a portion of a vehicle wheel (i.e. real-world object). The second set of feature descriptors may include feature descriptors in each of the three cardinal axes (i.e. x, y, and z) to ensure that any three-dimensional movement, change in viewing scale, or change in viewing perspective, can be captured.

Moreover, the virtual object component 322 may be configured to generate a virtual object profile for each virtual object. The virtual object profile may be configured to assist in overlaying a virtual object onto a real-world object. Further, the virtual object component 322 may use the virtual object profile to modify a representation of a virtual object based on changes in the orientation, viewing scale, or viewing perspective of an associated real-world object.

The virtual object component 322 may generate the virtual object profile by dimensionally parameterizing the two-dimensional and three-dimensional features of the virtual object. The intent of parameterizing the virtual object is to facilitate a seamless change in the profile of a virtual object in response to a change in orientation, viewing scale, or viewing perspective of the virtual object. In some examples, the virtual object component 322 may parameterize a virtual object based on its set of feature descriptors. The virtual object's set of feature descriptors are intended to interface with a real-world object's set of feature descriptors. Any change in orientation, viewing scale, or viewing perspective of the real-world object is likely to be reflected in the real-world object's set of feature descriptors. Therefore, by association, a change in the real-world object's set of feature descriptors equates to the same change in the virtual object's set of feature descriptors and based on the virtual object's set of feature descriptors, the virtual object can be made to reflect any change orientation, viewing scale, and viewing perspective of the real-world object.

The overlay component 326 may be configured to generate an augmented multimedia stream by overlaying a virtual object onto a real-world object. The overlay may occur by anchoring the virtual object's set of feature descriptors to the real-world object's set of feature descriptors. In the event that the real-world object moves, or its viewing perspective changes—as viewed from a client device—the relative position of the virtual object to the real-world object may remain unchanged based on the interfacing sets of feature descriptors.

Further, the overlay component 326 is configured to monitor the real-world object for movement or changes in viewing posture. Viewing posture equates to the orientation, viewing scale, or viewing perspective of the real-world object. In response to detecting a movement or change in viewing posture, the overlay component 326 may interact with the virtual object component 322 to modify a representation of the virtual object and overlay the modified representation into the augmented multimedia stream.

The overlay component 326 may monitor the real-world object continuously, per a predetermined schedule, or in response to a triggering event. The predetermined schedule may be set by an operator of the augmentation controller and may correspond to any time interval, such as one second, five seconds, or ten seconds. Further, the triggering event may correspond to a motion detected by the client device. The motion may be attributed to the movement of the client device relative to the real-world object, the real-world object relative to the client device, or a combination of both.

Further, the overlay component 326 may be configured to present metadata associated with a virtual object on a display of the client device. The metadata may include part specifications, along with aesthetic variations, such as color, design-pattern, size, and/or so forth. In some examples, the overlay component 326 may configure the presentation of the metadata to include a selectable option to modify an aesthetic presentation of the virtual object. Selectable options may include changes in color, design-pattern, etc. Here, the overlay component 326 may communicate a user selection to change an aesthetic feature of the virtual object to the virtual object component 322. In doing so, the virtual object component 322 may modify the virtual object accordingly.

The data store 318 may include a repository of virtual objects, virtual object profiles, virtual object metadata, associated sets of feature descriptors, and any other data pertinent to an operation of the augmentation controller 102.

Figure 4:
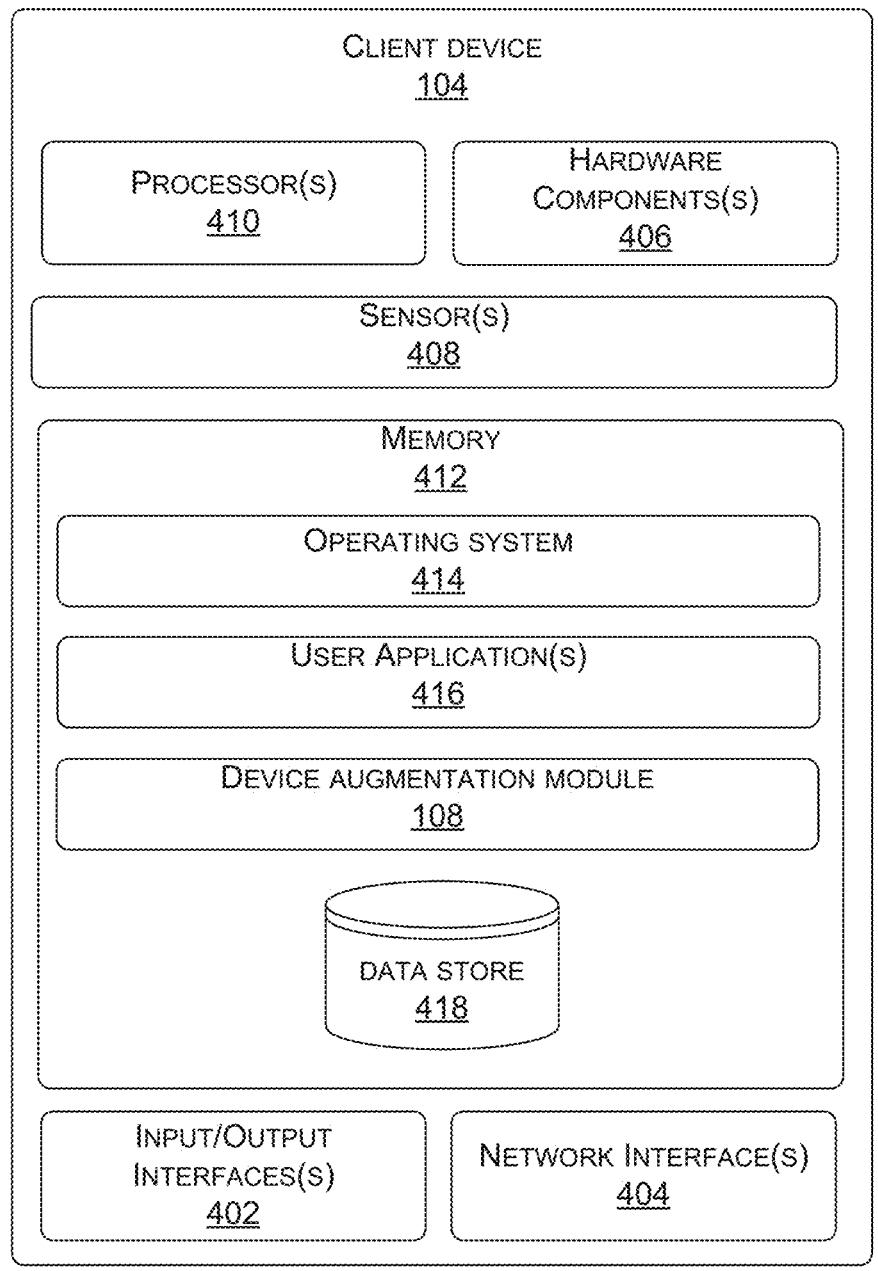
FIG. 4 illustrates various components of a client device that is communicatively coupled to the augmentation controller.

FIG. 4 illustrates various components of a client device that is communicatively coupled to the augmentation controller. In one example, the client device 104 is configured to transmit a real-time multimedia stream to a remote server, namely the augmentation controller 102, and in response, receive in real-time, an augmented multimedia stream. In another example, the client device 104 may be configured to perform the functions of the augmentation controller, thereby negating the demand for transmitting a real-time multimedia stream to the augmentation controller and in response, receiving an augmented multimedia stream.

The client device 104 may include input/output interface(s) 402 and network interface(s) 404. The input/ output interface(s) 402 may be similar to input/output interface(s) 302, and the network interface(s) 404 may be similar to network interface(s) 304. The client device 104 may include hardware component(s) 406. The hardware component(s) 406 may be similar to the hardware component(s) 306.

The client device 104 may include sensor(s) 408 that are configured to capture a real-time multimedia stream. The sensor(s) 408 may include at least a camera and microphone to capture the real-time multimedia stream. The sensor(s) 408 may further include an accelerometer, a proximity sensor, or any other motion detection sensor that can detect movement of the client device 104 relative to a real-world object within the real-time multimedia stream.

The client device 104 may include one or more processor(s) 410 that are operably connected to memory 412. The one or more processor(s) 410 may be similar to the one or more processor(s) 308, and the memory 412 may be similar to the memory 310.

The memory 412 may include an operating system 414, user application(s) 416, a device augmentation module 108, and a data store 418. The operating system 414 may be any operating system capable of managing computer hardware and software resources. The operating system 414 may include an interface layer that enables applications to interface with the input/output interface(s) 402 and the network interface(s) 404.

User application(s) 416 may include any application executable via the client device 104. The user application(s) 416 may reside in the memory 412 of the client device 104 or reside on a separate server that is remotely accessible by the client device 104.

The device augmentation module 108 may be configured to interface with the augmentation controller 102. More specifically, the device augmentation module 108 may be configured to transmit a real-time multimedia stream to the augmentation controller 102 and receive an augmented multimedia stream from the augmentation controller 102. Additionally, the device augmentation module 108 may communicate monitored data to the augmentation controller 102, such as the detection of a change in orientation or viewing posture of the real-world object relative to the real-time multimedia stream. Further, the device augmentation module 108 may be configured to receive user selections to modify the representation of a virtual object within an augmented multimedia stream.

Further, the device augmentation module 108 may be configured to present metadata associated with the virtual object on a display of the client device while the virtual object is in view within an augmented multimedia stream. The metadata may include part specifications, along with aesthetic variations, such as color, design-pattern, size, and/or so forth. As part of the metadata, the device augmentation module 108 may present selectable options on a display of the client device 104 to modify the aesthetic features of the virtual object, such as color or design patterns.

In an alternative embodiment, the device augmentation module 108 may be configured to perform the functions of the augmentation controller 102, thereby negating the demand for transmitting a real-time multimedia stream to the augmentation controller 102 and in response, receiving an augmented multimedia stream.

The data store 418 may include a repository of virtual objects, virtual object profiles, virtual object metadata, associated sets of feature descriptors, and any other data pertinent to an operation of the device augmentation module 108.

FIGS. 5 through 8 present processes 500 through 800 that relate to operations of the augmentation controller 102. Each of the processes 500 through 800 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500 through 800 are described with reference to the computing environment 100 of FIG. 1.

Figure 5:
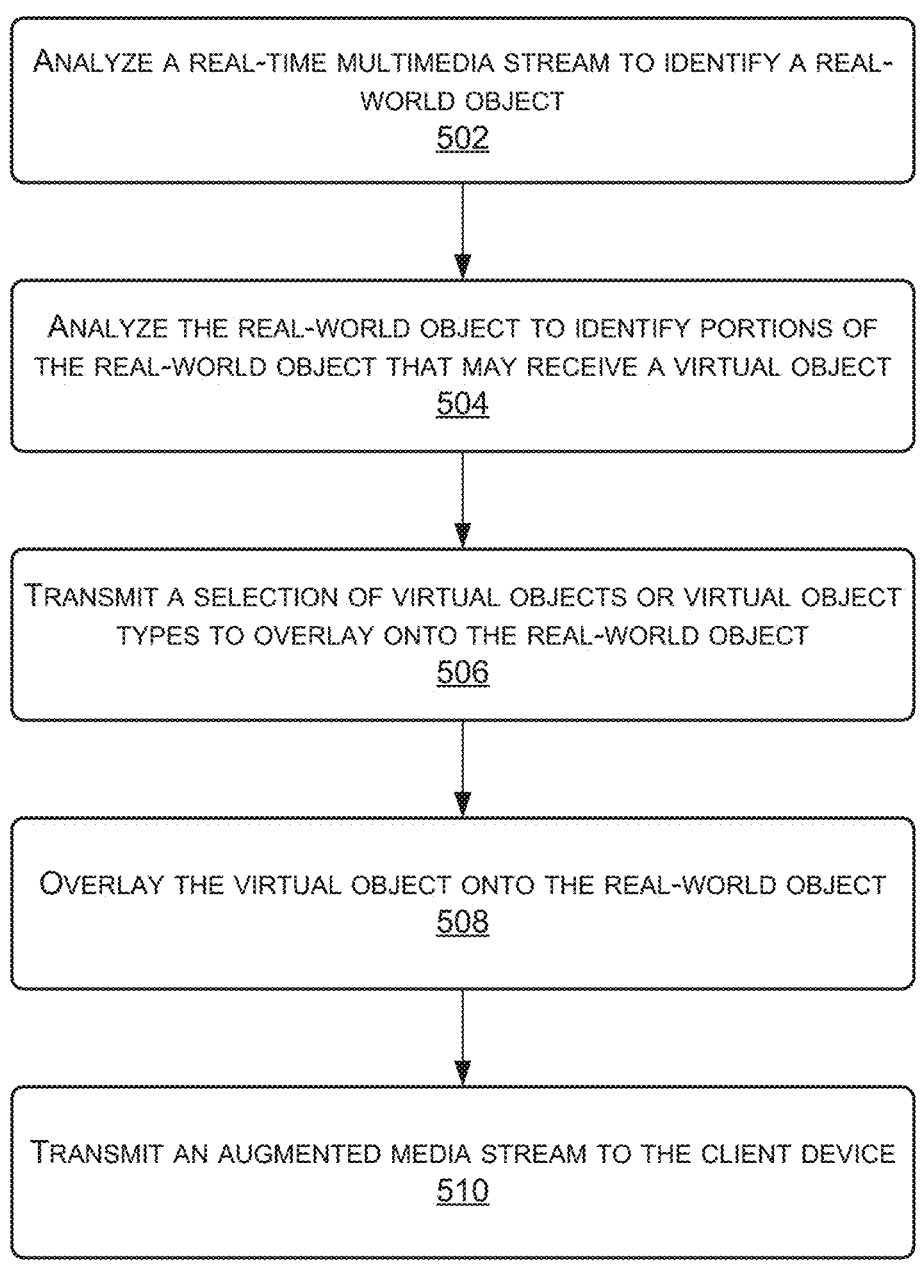
FIG. 5 illustrates a process for selecting and incorporating a virtual object within an augmented multimedia stream.

FIG. 5 illustrates a process for selecting and incorporating a virtual object within an augmented multimedia stream. Process 500 is presented from the perspective of the augmentation controller that receives a real-time multimedia stream from a client device. In this process, the augmentation controller may receive a real-time multimedia stream from a client device that includes a real-world object. Following an analysis, the augmentation controller may transmit an augmented multimedia stream to the client device that overlays a virtual object onto the real-world object.

At 502, the augmentation controller may analyze a real-time multimedia stream to identify a real-world object that is visually captured by the stream. The real-world object may correspond to any tangible product or formation, such as a building, a vehicle, a table, a chair, a bridge, or a naturally occurring formation, such as a river, mountain-face, and/or so forth.

At 504, the augmentation controller may employ one or more machine-learning algorithms to further analyze the real-world object to identify portions of the real-world object to which a virtual object may be overlaid. For example, consider a vehicle as the real-world object. Here, the augmentation controller may analyze the vehicle to determine that automotive accessories may be overlaid as virtual objects. Automotive accessories may include, without limitation, wheelrims, mudguards, spoiler assemblies, roof racks, or any other accessory type with at least one mounting point to an external feature of the vehicle.

At 506, the augmentation controller may transmit, to the client device, a selection of virtual objects or virtual object types to overlay onto the real-world object. Virtual object types may be based on the analysis conducted in process step 604. Further, upon receipt of a selection of a virtual object type, the augmentation controller may present the client device with one or more virtual objects associated with the selected virtual object type.

Alternatively, or additionally, the augmentation controller may prompt and receive, from the client device, an image relating to the virtual object. Continuing with an earlier example, the image may correspond to an automotive accessory, such as a wheelrim for a vehicle (i.e. real-world object) within the real-time multimedia stream. Here, the augmentation controller may analyze the image to identify the object (i.e. automotive accessory), and in doing so, present the client device with one or more corresponding virtual objects.

At 508, upon receipt of a selected virtual object, the augmentation controller may overlay the virtual object onto the real-world object. In some examples, the augmentation controller may modify a profile of the virtual object to correlate with a viewing perspective of the real-world object.

At 510, the augmentation controller may transmit an augmented media stream to the client device that illustrates the virtual object overlaid onto the real-world object.

Figure 6:
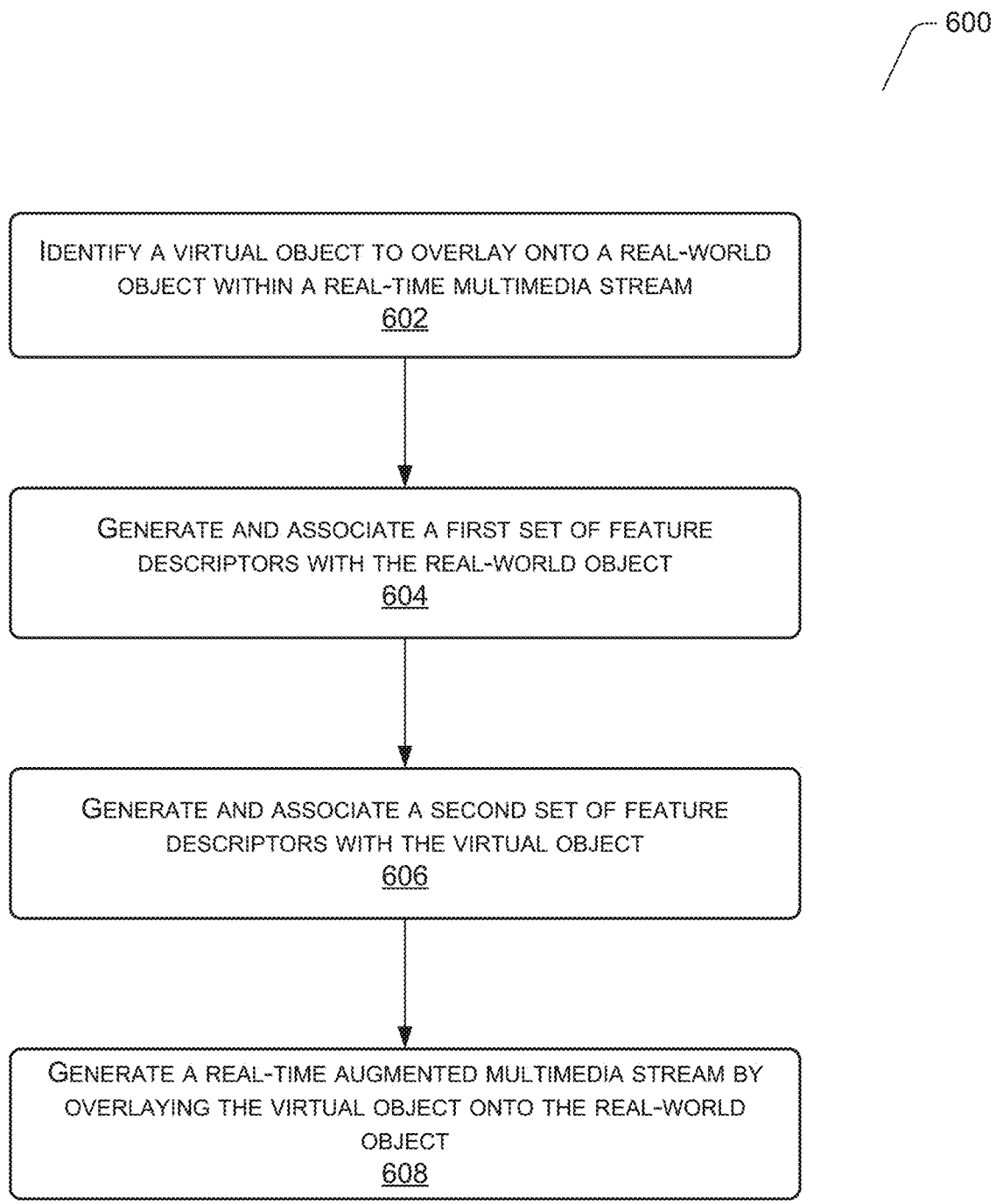
FIG. 6 illustrates a process for generating an augmented multimedia stream by overlaying a virtual object onto a real-world object.

FIG. 6 illustrates a process for generating an augmented multimedia stream by overlaying a virtual object onto a real-world object. Process 600 is described from the perspective of the augmentation controller that receives a real-time multimedia stream and virtual object selection from a client device.

At 602, the augmentation controller may identify a virtual object to overlay onto a real-world object visually captured within a real-time multimedia stream. In one example, the augmentation controller may receive, from a client device, an image of an object that corresponds to the virtual object, and in doing so, analyze the image to identify the object, and identify corresponding virtual objects based on the identified object. Virtual objects may be sourced from the augmentation or a third-party server.

At 604, the augmentation controller may generate and associate a first set of feature descriptors with the portions of the real-world object to which a virtual object may be overlaid. The first set of feature descriptors are intended to act as anchor points for the overlay of the virtual object. In some examples, the first set of feature descriptors may include feature descriptors in each of the three cardinal axes (i.e. x, y, and z) to ensure that any three-dimensional movement, change in viewing scale, or change in viewing perspective, can be captured.

At 606, the augmentation controller may generate and associate a second set of feature descriptors with the virtual object. The second set of feature descriptors are intended to interface with the first set of feature descriptors on the real-world object. For example, a wheelrim (i.e. virtual object) may be configured to interface with a portion of a vehicle wheel (i.e. real-world object).

At 608, the augmentation controller may generate a real-time augmented multimedia stream by overlaying the virtual object onto the real-world object. The overlay occurs by anchoring the second set of feature descriptors (i.e. virtual object) to the first set of feature descriptors (i.e. real-world object). In the event that the real-world object moves, or its viewing perspective changes—as viewed from the client device—the position of the virtual object relative to the real-world object may remain unchanged based on the interfacing sets of feature descriptors.

Figure 7:
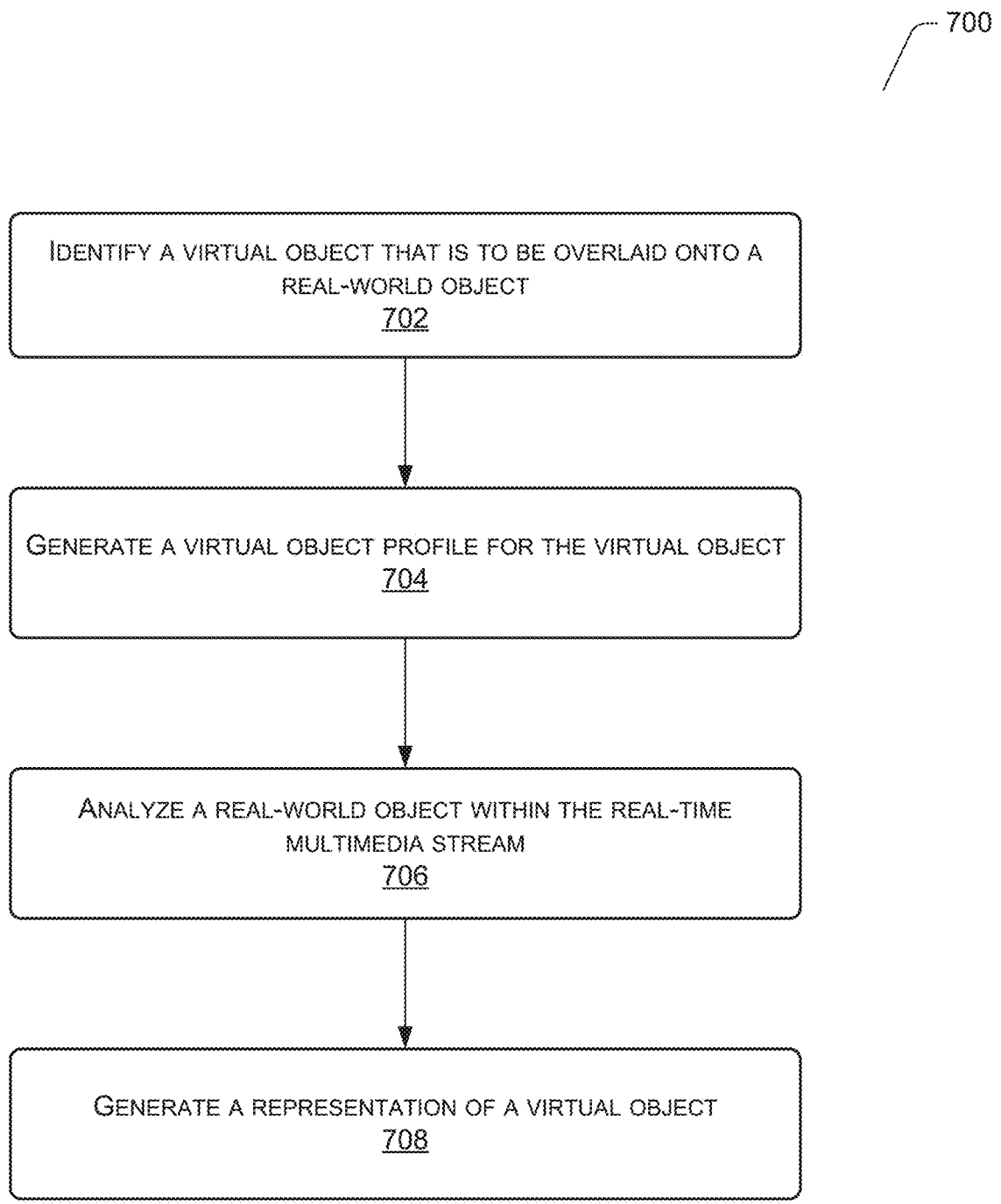
FIG. 7 illustrates a process for generating a virtual object profile to assist in overlaying a virtual object onto a real-world object.

FIG. 7 illustrates a process for generating a virtual object profile to assist in overlaying a virtual object onto a real-world object. The augmentation controller may use the virtual object profile to modify a representation of a virtual object based on changes to the orientation, viewing scale, or viewing perspective of an associated real-world object. Process 700 is described from the perspective of the augmentation controller while generating the real-time augmented multimedia stream.

At 702, the augmentation controller may identify a virtual object that is to be overlaid onto a real-world object. In one example, the augmentation controller may provide a client device with a selection of virtual objects to overlay on a real-world object, and in response, identify the virtual object based on user selection. In other examples, the augmentation controller may prompt for, and receive an indication of a virtual object. The indication may be text identifying the virtual object or an image that includes the virtual object as a dominant object.

At 704, the augmentation controller may generate a virtual object profile for the virtual object. The virtual object profile may parameterize at least one of a viewing scale or a viewing perspective of a virtual object. In this way, following an analysis of a real-world object to determine its orientation, viewing scale, and viewing perspective, the augmentation controller may use the virtual object profile to create a representation of the virtual object that aligns with the real-world object.

In some examples, the augmentation controller may parameterize a virtual object based on its set of feature descriptors. A virtual object's set of feature descriptors are intended to interface with a real-world object's set of feature descriptors. Any change in the orientation, viewing scale, or viewing perspective of the real-world object is likely to be reflected in the real-world object's set of feature descriptors. Therefore, by association, a change in the real-world object's set of feature descriptors equates to the same change in the virtual object's set of feature descriptors and, based on the virtual object's set of feature descriptors, the virtual object can be made to reflect any change orientation, viewing scale, and viewing perspective of the real-world object.

At 706, the augmentation controller may analyze a real-world object within the real-time multimedia stream. The analysis may involve determining the position of each feature descriptor within the real-world object's set of feature descriptors, and their relative displacement to one another.

At 708, the augmentation controller may generate a representation of a virtual object based at least in part on the analysis of the real-world object. Here, as discussed in process step 804, the augmentation controller may adopt the positions of the real-world object's set of feature descriptors for the virtual object's set of feature descriptors. In doing so, the virtual object profile may be used to generate a representation of the virtual object, based on the orientation, viewing scale, and viewing perspective of the real-world object.

Figure 8:
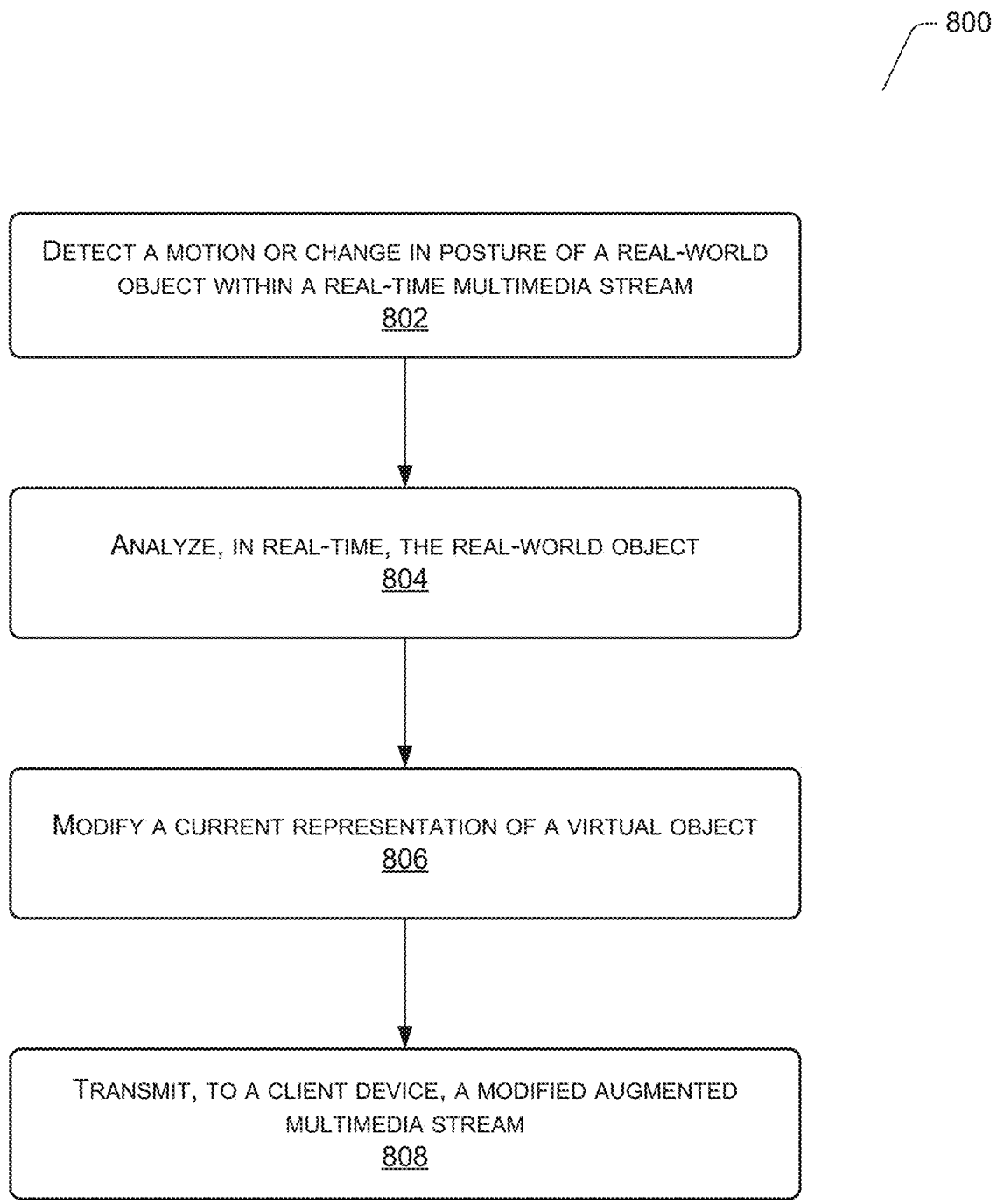
FIG. 8 illustrates a process for detecting a change in a real-world object and synchronizing a real-time change to the virtual object.

FIG. 8 illustrates a process for detecting a change in a real-world object and synchronizing a change to the virtual object. The change to the real-world object may include a change in orientation, viewing scale, or viewing perspective. The change may also include a movement of the real-world object relative to its surrounding environment. Process 800 is described from the perspective of the augmentation controller as it receives a real-time multimedia stream from a client device.

At 802, the augmentation controller may detect a motion or a change in viewing posture of a real-world object visually captured within a real-time multimedia stream. The change in viewing posture may include a change in orientation, viewing scale, or viewing orientation of the real-world object. In some examples, the motion or change in viewing posture may reflect the movement of the real-world object, itself. In other examples, the motion or change in viewing posture may reflect a movement of the client device relative to the real-world object. For example, a user may walk around the real-world object with their client device in hand.

At 804, the augmentation controller may analyze the real-world object in real-time to determine the position of each feature descriptor within the real-world object's set of feature descriptors and their relative displacement to one another.

At 806, the augmentation controller may modify a current representation of a virtual object based at least in part on the analysis of the real-world object. Here, the modification may include incremental changes to the current relative position of the virtual object's set of feature descriptors, based on the real-world object's set of feature descriptors. In some examples, the augmentation controller may implement the modification via a virtual object profile, which was described in more detail with reference to process 700.

At 808, the augmentation controller may transmit, to the client device, a modified augmented multimedia stream that includes the modified representation of the virtual object.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system, comprising:
one or more processors;
memory coupled to the one or more processors, the memory including one or more modules that are executable by the one or more processors to:
receive, from a client device, a real-time multimedia stream that includes an image of a real-world object;
analyze the image of the real-world object to identify a first set of feature descriptors;
identify a virtual object to overlay onto a feature descriptor of the first set of feature descriptors;
analyze the virtual object to identify a second set of feature descriptors;
generate an augmented multimedia stream that overlays a representation of the virtual object onto the image of the real-world object, based at least in part on an overlay of the first set of feature descriptors and the second with the second set of feature descriptor; and
transmit, to the client device, the augmented multimedia stream.

2. The system of claim 1, wherein the first set of feature descriptors correspond to portions of the image of the real-world object or reference points within the image of the real-world object.

3. The system of claim 1, wherein to associate the virtual object to the image of the real-world object further includes:
transmitting, to the client device, a plurality of virtual object to overlay onto the feature descriptor of the image of the real-world object; and
receiving, from the client device, a selection of the virtual object from the plurality of virtual objects.

4. The system of claim 3, wherein the one or more modules are further executable by the one or more processors to:
receive, from the client device, an image of the virtual object;
analyze the image to identify the virtual object; and
retrieve, from a remote server, the plurality of virtual objects, based at least in part on an identity of the virtual object.

5. The system of claim 1, wherein the one or more modules are further executable by the one or more processors to:
generate a virtual object profile of the virtual object that parameterizes at least one of a size of the virtual object or a viewing perspective of the virtual object;

analyze the real-time multimedia stream to determine an orientation and size of the image of the real-world object; and
create the representation of the virtual object, based at least in part on the orientation and size of the image of the real-world object and the virtual object profile.

6. The system of claim 1, wherein the one or more modules are further executable by the one or more processors to:
detect a change in orientation of the image of the real-world object within the real-time multimedia stream; and
modify the representation of the virtual object within the augmented multimedia stream to correlate with the change in orientation of the image of the real-world object.

7. The system of claim 1, wherein the one or more modules that further executable by the one or more processors to:
detect a real-time motion of the image of the real-world object within the multimedia stream; and
synchronize an orientation of the virtual object with the image of the real-world object, based at least in part on the real-time motion.

8. The system of claim 1, wherein the virtual object corresponds to a wheelrim of a vehicle and the image of the real-world object corresponds to the vehicle, and
wherein, the first set of feature descriptors includes at least a reference point on a vehicle wheel.

9. The system of claim 1, wherein the virtual object corresponds to an external accessory of a vehicle and the image of the real-world object corresponds to the vehicle, and
wherein, the first set of feature descriptors includes at least a mounting point of the external accessory on the vehicle.

10. A computer-implemented method, comprising:
under control of one or more processors:
receiving, from a client device, an indication of a virtual object that is to be augmented onto a real-world object on a real-time multimedia stream;
identifying a first set of feature descriptors associated with the virtual object;
parsing the real-time multimedia stream to identify the real-world object;
analyzing the real-world object to identify a second set of feature descriptors;
generating a scaled representation of the virtual object, based at least in part on the second set of feature descriptors; and
generating an augmented multimedia stream that overlays and anchors the scaled representation of the virtual object in real-time over the real-world object within the real-time multimedia stream, based at least in part on an alignment of the first set of feature descriptors and the second set of feature descriptors.

11. The computer-implemented method of claim 10, wherein the first set of feature descriptors correspond to anchor points that interface with a real-world object, and
wherein, the second set of feature descriptors correspond to anchor points that interface with the virtual object.

12. The computer-implemented method of claim 10, further comprising:
generating a virtual object profile of the virtual object that includes at least a parameterized model of the virtual object, the parameterized model permitting a change in a profile the virtual object based on size, orientation and viewing perspective, and wherein, generating the scaled representation of the virtual object is further based at least in part on the virtual object profile.

13. The computer-implemented method of claim 10, wherein, parsing the real-time multimedia stream further includes determining an orientation and a viewing perspective of the real-world object, and wherein, generating the scaled representation of the virtual object is further based at least in part on the orientation and the viewing perspective of the real-world object.

14. The computer-implemented method of claim 10, wherein the virtual object is overlaid and anchored to the real-world object at a set of discrete points, and further comprising:

detecting a first motion of the real-world object within the real-time multimedia stream; and synchronizing a second motion of the virtual object with the first motion of the real-world object, wherein the virtual object remains overlaid and anchored to the real-world object at the set of discrete points.

15. The computer-implemented method of claim 14, wherein the virtual object corresponds to a wheelrim and the real-world object corresponds to a vehicle, wherein, the set of discrete points includes a discrete point on a vehicle wheel, and wherein, the second motion of the virtual object corresponds to a synchronous spinning of the wheelrim relative to the vehicle wheel.

16. The computer-implemented method of claim 10, further comprising:

detecting a change in orientation of the image of the real-world object within the real-time multimedia stream; and modifying the representation of the virtual object within the augmented multimedia stream to correlate with the change in orientation of the image of the real-world object.

17. One or more non-transitory computer-readable media storing computer-executable instructions that, when executed on one or more processors, cause the one or more processors to perform acts comprising:

identifying a virtual object that is to be overlaid and anchored onto a real-world object in a real-time multimedia stream;

determining a first set of feature descriptors associated with the virtual object that act as anchor fixed on the virtual object that anchor to the real-world object;

determining a second set of feature descriptors associated with the real-world object that act as fixed points on the real-world object to interface with the first set of feature descriptors;

generating an augmented multimedia stream by overlaying the first set of feature descriptors of a representation of the virtual object to the second set of feature descriptors of the real-world object; and transmitting the augmented multimedia stream, in real-time, to a client device.

18. The one or more non-transitory computer-readable media of claim 17, wherein the acts further comprise:

generating a virtual object profile of the virtual object that parameterizes at least one of a size of the virtual object or a viewing perspective of the virtual object;

analyzing the real-time multimedia stream to determine an orientation and size of the real-world object; and creating the representation of the virtual object, based at least in part on the orientation and size of the real-world object and the virtual object profile.

19. The one or more non-transitory computer-readable media of claim 17, wherein the acts further comprise:

detecting a first real-time motion of the real-world object within the multimedia stream; and synchronizing a second real-time motion of the virtual object within the augmented multimedia stream with the first real-time motion.

20. The one or more non-transitory computer-readable media of claim 17, wherein the virtual object corresponds to a wheelrim and the real-world object corresponds to a vehicle.

* * * * *